(12) United States Patent
Chen et al.

(10) Patent No.: US 7,664,107 B2
(45) Date of Patent: Feb. 16, 2010

(54) SELF-STABILIZING AND FAST-CONVERGENT STRUCTURED PEER-TO-PEER OVERLAYS

(75) Inventors: Wei Chen, Beijing (CN); Yu Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/399,679

(22) Filed: Apr. 5, 2006

(65) Prior Publication Data

US 2007/0237089 A1 Oct. 11, 2007

(51) Int. Cl.
*H04L 12/28* (2006.01)
(52) U.S. Cl. .................. 370/389; 370/401; 709/238
(58) Field of Classification Search .............. None
See application file for complete search history.

(56) References Cited

U.S. PATENT DOCUMENTS

| | | | | |
|---|---|---|---|---|
| 2004/0148326 | A1* | 7/2004 | Nadgir et al. | 709/200 |
| 2004/0165604 | A1* | 8/2004 | Oh et al. | 370/401 |
| 2006/0039297 | A1* | 2/2006 | McNab | 370/252 |
| 2006/0085385 | A1* | 4/2006 | Foster et al. | 707/1 |
| 2006/0190715 | A1* | 8/2006 | Miller | 713/150 |
| 2006/0190716 | A1* | 8/2006 | Miller | 713/150 |
| 2006/0191020 | A1* | 8/2006 | Miller | 726/28 |
| 2008/0130516 | A1* | 6/2008 | You et al. | 370/254 |

OTHER PUBLICATIONS

Birman, "The Process Group Approach to Reliable Distributed Computing", *Communications of the ACM*, vol. 36, No. 12, pp. 37-53 (Dec. 1993).
Liben-Nowell et al., "Analysis of the Evolution of Peer-to-Peer Systems", *ACM Conf. on Principles of Distributed Computing (PODC)*, 10 pp., Monterey, CA (Jul. 2002).
Lynch et al., "Atomic Data Access in Distributed Hash Tables", *In Proceedings of the 1st International Workshop on Peer-to-Peer Systems*, 11 pp., (IPTPS 2002.
Rhea et al., "Handling Churn in a DHT", *Proceedings of the USENIX Annual Technical Conference*, pp. 1-14 (Jun. 2004).
Rowstron et al., "Pastry: Scalable, decentralized object location and routing for large-scale peer-to-peer systems", *Proceedings of the 18th IFIP/ACM International Conference on Distributed Platforms*, 22 pp., Heidelberg, Germany (Nov. 2001).
Stoica et al., "Chord: A Scalable Peer-to-Peer Lookup Service for Internet Applications", *SIGCOMM*, pp. 149-160, San Diego, California (Aug. 2001).
Van Renesse et al., "Horus: A Flexible Group Communication System", *Communications of the ACM*, pp. 76-83, vol. 39, No. 4 (Apr. 1996).

* cited by examiner

*Primary Examiner*—Bob A Phunkulh
(74) *Attorney, Agent, or Firm*—Klarquist Sparkman, LLP

(57) ABSTRACT

A self-stabilizing overlay maintenance protocol in structured peer-to-peer overlay system stabilizes any initially connected overlay topology to a correct topology. According to the protocol, a node in the overlay system periodically pings neighboring nodes in the leafset of its routing table, who respond with a pong message containing the recipient's view of the ping sender's leafset. The protocol further conserves connectivity when removing a directed link to another node, by first creating a link to a replacement node that in turn has a link to that node. The protocol uses a ping-pong-notify message exchange to track sink and source sets of the directed links between nodes. The protocol also achieves fast convergence, such as in the partition healing scenario, by leveraging the finger set in the routing table to establish and quickly spread healing points from which the protocol can stabilize the structure.

17 Claims, 14 Drawing Sheets

```
1   class Node {
2     NodeSet acqu; //acquaintances
3     NodeSet cand; //candidates
4   };
5   Node::LeafsetOf(n) //Leafset of n according
6                      //to local view
7   {
8     Succ=L immediate successors of n in acqu;
9     Pred=L immediate predecessors of n in acqu;
10    return <Pred, Succ>;
11  }
12  Node::SendPing() //invoked periodically
13  {
14    //leafset of myself
15    <Pred, Succ>=LeafsetOf(me);
16    leafset=Pred union Succ;
17    msg.type=ping;
18
19    //monitor the aliveness of leafset members
20    Foreach (n in leafset)
21       Send msg to n;
22    //search for closer nodes
23    If (|leafset|<2L) {
24       Foreach (n in cand\leafset)
25          Send msg to n;
26    } else {
27       s=ID of the farthest node in Pred;
28       e=ID of the farthest node in Succ;
29       Foreach (n in cand\leafset)
30          If (n.ID is in (s,e))
31             Send msg to n;
32    }
33  }
34  Node::OnReceiveMsg(msg)
35  {
36    Merge msg.sender into acqu;
37    Merge msg.sender into cand;
38    //reply with my view
39    If (msg.type==ping) {
40       //leafset of msg.sender in my view 41       <Pred, Succ>=LeafsetOf(msg.sender);

42       msg'.Leafset=Pred union Succ;

43       msg'.type=pong;
44       Send msg' to msg.sender;
```

```
1   struct Sink {
2     Node      n;           //the sink
3     NodeSet Replacement;   //the replacement set
4   };
5   typedef set<Sink> SinkSet;
6   class Node {
7     SinkSet sinks;    //sinks
8     NodeSet sources;  //sources
9     NodeSet cand;     //candidates
10  };
11  Node::LeafsetOf(n, set)
12  //Leafset of n according to view set
13  {
14    Succ=L immediate successors of n in set;
15    Pred=L immediate predecessors of n in set;
16    return <Pred, Succ>;
17  }
18  Node::SendPing() //invoked periodically
19  {
20    NodeSet sent=empty;
21    msg.type=ping;
22    Foreach (s in sinks) {
23      if (s.n is not in sent)
24        Send msg to s.n;
25      u = closest node to me in s.Replacement;
26      If (u is not in sent
27          && me is not in s.Replacement)
28        Send msg to u;
29      sent=sent union {s.n, u};
30    }
31    //leafset of myself
32    <Pred, Succ>=LeafsetOf(me, sinks);
33
34    //search for closer nodes
35    If (|Pred union Succ|<2L) {
36      Foreach (n in cand\sent)
37        Send msg to n;
38    } else {
39      s=ID of the farthest node in Pred;
40      e=ID of the farthest node in Succ;
41      Foreach (n in cand\sent)
42        If (n.ID is in (s,e))
43          Send msg to n;
44    }
45  }
46  Node::OnReceivePing(msg)
```

```
46  Node::OnReceivePing(msg)
47  {
48    msg'.type=pong;
49    //compute replacement set
50    <Pred, Succ>=LeafsetOf(me, sources);
51    msg'.replacement=Pred union Succ;
52    // compute leafset view of the sender
53    acqu=sources union {s.n|s in sinks};
54    <Pred, Succ>=LeafsetOf(msg.sender, acqu);
55    msg'.View=Pred union Succ;
56    Send msg' to msg.sender;
57    Merge msg.sender into cand;
58  }
59  Node::OnReceivePong(msg)
60  {
61    Sink s;
62    s.n = msg.sender;
63    s.Replacement = msg.Replacement;
64    Merge s.n into cand;
65    Merge s.Replacement\{me} into cand;
66    Merge msg.View\{me} into cand;
67
68    bool bKeepInSinks=false;
69    <Pred, Succ>=LeafsetOf(me, sinks);
70    left=ID of the farthest node in Pred;
71    right=ID of the farthest node in Succ;
72    // only add s to sink if it is close
73    If (s.n is in sinks || |Pred union Succ|<2L
74        || s.n is within (left, right))
75      bKeepInSinks=true;
76
77    // check if s is a replacement for any
78    // faraway nodes. If so, do the replacement
79    SinkSet to_remove=empty;
80    Foreach (x in sinks\(Pred union Succ)) {
81      If (s.n is in x.Replacement &&
82          s.n is closer to me than x.n &&
83          s.n is closer to x.n than me &&
84          me is not in x.Replacement)
85        to_remove=to_remove union {x};
86    }
87    if (to_remove is not empty) {
88      sinks = sinks \ to_remove;
89      bKeepInSinks=true;
90    }
91    If (bKeepInSinks) {
92      Refresh or Merge s into sinks;
93      msg'.type=notify;
94      Send msg' to s.n;
95    }
96  }
```

```
97   Node::OnReceiveNotify(msg)
98   {
99     Merge msg.sender in sources;

100    Merge msg.sender in cand;
101  }
102  Node::CheckFreshness()  //invoked periodically 103  {
104    Foreach (s in sinks)
105      If (not received pong from s for time t)

106        remove s from sinks;
107
108    Foreach (s in sources)
109      If (not received notify from s for time t)

110        remove s from sources;
111
112    Foreach (n in cand)
113      If (not heard about n for time t)

114        remove n from cand;
115  }
```

```
1   ...
2   class Node {
3     SinkSet sinks;      //sinks
4     NodeSet sources;    //sources
5     NodeSet cand;       //candidates
6     NodeSet pingset;    //nodes to be pinged for
7                         //pseudo routing
8   }
9   ...
10  Node::SendPing()  //invoked periodically
11  {
12    ...
13    //search for closer nodes
14    If (|Pred union Succ|<2L) {
15      Foreach (n in cand\sent)
16        Send msg to n;
17      sent = sent union cand;
18    } else {
19      s=ID of the farthest node in Pred;
20      e=ID of the farthest node in Succ;
21      Foreach (n in cand\sent)
22        If (n.ID is in (s,e)) {
23          Send msg to n;
24          sent = sent union {n};
25        }
26    }
27    //following fingers
28    Foreach (n in pingset\sent)
29      Send msg to n;
30    pingset = empty;
31  }
32  ...
33  Node::OnReceivePing(msg)
34  {
35    ...
36    //compute leafset view of the sender
37    acqu=sources union {s.n|s in sinks};
38    //incorporate fingers
39    acqu=acqu union fingers;
40    <Pred, Succ>=LeafsetOf(msg.sender, acqu);
41    msg'.View=Pred union Succ;
42    Send msg' to msg.sender;
43    ...
44  }
```

```
45   Node::OnReceivePong(msg)
46   {
47     ...
48     Merge s.n into cand;
49     Merge s.Replacement into cand;
50     Merge msg.View into cand;
51     //pinging the closest one is enough
52     to_ping = closest node in msg.View\{me};
53     Merge to_ping into pingset;
54     ...
55   }
```

Figure 14

```
1   class Node {
2     ...
3     NodeSet myFingers;
4     NodeSet lnFingers;  //fingers of left
5                         //neighbor
6     NodeSet rnFingers;  //finger of right
7                         //neighbor
8   };
9   Node::XchgFingerTable() //Invoked
10                //with Ping or periodically
11  {
12    <Pred, Succ>=LeafsetOf(me, sinks);
13    LNeighbor=closest node in Pred;
14    RNeighbor=closest node in Succ;
15    msg.fingers=myFingers;
16    Send msg to LNeighbor and RNeighbor;
17  }
18  Node::OnRecvXchgFingerTableMsg(msg)
19  {
20    <Pred, Succ>=LeafsetOf(me, sources);
21    LNeighbor=closest node in Pred;
22    RNeighbor=closest node in Succ;
23    if (msg.sender==RNeighbor)
24       rnFingers=msg.fingers;
25    if (msg.sender==LNeighbor)
26       lnFingers=msg.fingers;
27  }
28  Node::ProbeFingers() //Invoked when
29                      //probing fingers
30  {
31    for each finger f to be probed {
32       // send the closest finger entries
33       // of left and right neighbors to f
34       msg.ln=ClosestNode(f, lnFingers);
35       msg.rn=ClosestNode(f, rnFingers);
36       Probe f with msg;
37    }
38  }
```

```
39  Node::OnRecvFingerProbe(msg)
40  {
41    <Pred, Succ>=LeafsetOf(me, sinks);
42    s=ID of the farthest node in Pred;
43    e=ID of the farthest node in Succ;
44    if (msg.ln.ID is in (s,e))
45      Merge msg.ln into cand;
46    if (msg.rn.ID is in (s,e))
47      Merge msg.rn into cand;
48    ...
49    normal finger probe msg handling ;
50    ...
51  }
```

Software 1680 Implementing P2P System
With Leafset Maintenance Protocol

SELF-STABILIZING AND FAST-CONVERGENT STRUCTURED PEER-TO-PEER OVERLAYS

BACKGROUND

Peer-to-peer (P2P) systems have been popularized by Internet file-sharing applications, and also have gained significant attention among researchers due to their capability to provide a scalable alternative to more traditional client-server approaches with lower cost.

In peer-to-peer systems based on structured overlays, each peer maintains a routing table that contains a partial list of other peers in the system, such that the routing tables of the peers collectively form an overlay topology. Structured overlays support key-based routing functionality, which means that given a key, the overlay can route the key to a destination defined to host this key. Key-base routing is used to build important distributed data structures, such as distributed hash tables, and to support peer-to-peer applications such as peer-to-peer storage and peer-to-peer multicast applications. The overlay topologies are designed with certain properties so that key-based routings on the topologies are efficient.

Besides routing efficiency, it is also important that the key-base routing implementation also provide a routing consistency guarantee, meaning that the overlay should consistently route the same key to the same destination no matter where the routing is initiated. Routing consistency is important for applications. For example, in a P2P storage application, if the routings are not consistent, a read request to an object may be routed to a wrong destination, causing a read failure or retries or other extra system repair actions. So providing routing consistency can reduce errors and maintenance cost of the applications.

To guarantee routing consistency, we need a correct overlay topology that satisfies the properties as designed. However, maintaining a correct overlay topology is not an easy task because of the highly dynamic natures of P2P systems. Most P2P systems have a large number of peers across wide area networks with unstable connections, and peers join and leave the system at any time, which is referred to as system churn. These dynamic changes of the system may lead to incorrect overlay topologies and cause inconsistent routing results.

Early peer-to-peer system protocols were not good at handling system churn. When the system churn is high, many routings either fail or return inconsistent results or incur long latency due to timeouts and retries. For example, when a large number of peers enter or leave the system at around the same time, which is referred to as flash crowds, the overlay topology could be damaged significantly. Existing proposals do not address this case in detail.

In addition to churns, network failures also cause incorrect overlay topologies. For example, when the IP layer routing failover speed after link failures is very slow, then the recovery from the incorrect overlay topology may also be slow. Moreover, if a backbone link fails and the failover is slow, the network may be partitioned, which may lead to partitions of overlay topologies and inconsistent routing results between different partitioned components.

Moreover, existing peer-to-peer system protocols may lead to an incorrect steady state, called loopy state, which causes inconsistent routing results and cannot be recovered by the basic protocol. A separate loopy detection and removal mechanism may be applied to recover a topology from the loopy state, but the recovery process is O(N) where N is the number of peers in the system. Therefore, the loopy state should be avoided as much as possible.

Overview of Structured P2P Overlays

In a structured P2P overlay, a large circular or linear key space is introduced first and each node chooses a unique key from the key space as its ID. In one example, each node chooses a unique numerical value as its ID and all nodes are sorted in a circular key space of 160 bits.

Nodes in the system can post messages with a destination key drawn from the same key space. The message is routed to a destination node based on the relationship between the destination key and the node ID. In one example, the message will be delivered to the node whose ID is the numerically closest one to the message destination key. In another example, each node owns the zone that starts from its predecessor's ID (exclusive) to its own ID in a circular key space, and the message is routed to the node whose zone contains the message destination key. Such message forwarding behavior based on the destination key is called key-based routing.

Each node in the system maintains a routing table, which contains a subset of nodes to which this node may forward messages for routing purpose. The routing tables on all nodes together form the overlay routing topology, which needs to satisfy certain constraints in order to provide correct and efficient key-based routing in the overlay.

In some implementations, each routing table is divided into two parts: the leafset table 120 and the finger table 130 as shown in FIG. 1. The leafset table remembers the logical neighbors of the node (e.g., node A 110) in the key space, which are the nodes whose IDs are closest to the ID of the node. In one example, the node's leafset table is the union of its predecessor and successor list. In the illustrated example, each node remembers L immediate preceding nodes and L immediate succeeding nodes in its leafset table.

Besides the leafset table, each node also maintains a finger table 130 to improve message routing performance. Different from the leafset table, the finger table remembers nodes that are relatively far away in the ID space. They are selected according to certain criteria to support efficient routing. In one example, the finger table consists of nodes that are $2^i$ distance away in the clockwise distance for different values of i. In another example, a node's finger table is called "routing table" and it remembers nodes that have common prefixes of specific lengths with the local node.

Key-based routing in these overlays typically consists of first routing through the finger tables to forward a message quickly to the neighborhood of the destination, and then routing through the leafset to locate the final destination. Most of the proposals have O(log N) as the routing table size and support O(log N) routing performance, where N is the system scale.

For routing consistency, leafset tables play a key role because they are used to locate the final destination in the process of key-based routing. Furthermore, leafset table maintenance is responsible of detecting node joins and leaves in the system. Therefore, the correctness of the leafset tables is the prerequisite of the routing consistency.

The content of a correct leafset table is determined by the geometry of the key space, the sorting rule of the keys in the key space and the current online nodes in the system. For instance, in a circular key space in which keys are sorted numerically, a node's leafset table must contain node entries with IDs numerically closest to the local node in the key space. Since the key space is circular, leafset tables of all nodes in the system resembles a ring topology.

Enforcing Routing Consistency

Routing consistency in structured P2P overlays is the property ensuring that routings with any given key always reach the correct node mapped by the key (a.k.a. the owner of the key). Unfortunately, most existing protocols only provide best-effort routing and do not guarantee this property. As a result, routings are sometimes erroneous. These routing errors become more frequent when churns and failures drive routing tables of nodes into inconsistent states. Some routing errors are difficult to correct and may exist for a long time.

Routing errors may decrease the performance of KBR-based applications or cause application errors. For example, applications using distributed hash tables to store key-value pairs may falsely report a stored key to be lost when routing to a wrong node, or start unnecessary replication maintenance. It is difficult for individual applications to build complex distributed data structures and systems on top of an inconsistent and error prone routing layer. To a certain extent, this makes structured P2P overlays less competent as a widely applicable building block for distributed systems.

SUMMARY

The following Detailed Description presents a self-stabilizing P2P overlay maintenance protocol, as well as enhancements to the protocol for achieving fast convergence. The protocol avoids incorrect topologies, such as loopy topologies. Some implementations of the protocol further achieve fast convergence during partition healing (e.g., O(log N) speed, where N is the number of nodes in the overlay).

The self-stabilizing overlay maintenance protocol stabilizes any initially connected overlay topology in structured peer-to-peer overlay system to a correct topology. According to the protocol, a node in the overlay system periodically pings neighboring nodes in the leafset of its routing table, who respond with a pong message containing the recipient's view of the ping sender's leafset. The protocol further preserves connectivity when removing a directed link to another node, by first creating a link to a replacement node that in turn has a link to that node. The protocol uses a ping-pong-notify message exchange to track sink and source sets of the directed links between nodes. The protocol also achieves fast convergence, such as in the partition healing scenario, by leveraging the finger set in the routing table to establish and quickly spread healing points from which the protocol can stabilize the structure.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

BRIEF DESCRIPTION OF THE DRAWINGS

FIG. 2 is a program code listing of a basic leafset maintenance protocol implemented by nodes in a P2P overlay system.

FIGS. 8, 9 and 10 are a program code listing of an extension of the leafset maintenance protocol for connectivity preservation.

FIGS. 11 and 12 are a program code listing of an extension of the leafset maintenance protocol for fast overlay convergence.

FIGS. 14 and 15 are a program code listing of an extension of the leafset maintenance protocol for fast generation of new healing points by finger table exchanges.

DETAILED DESCRIPTION

Figure 1:
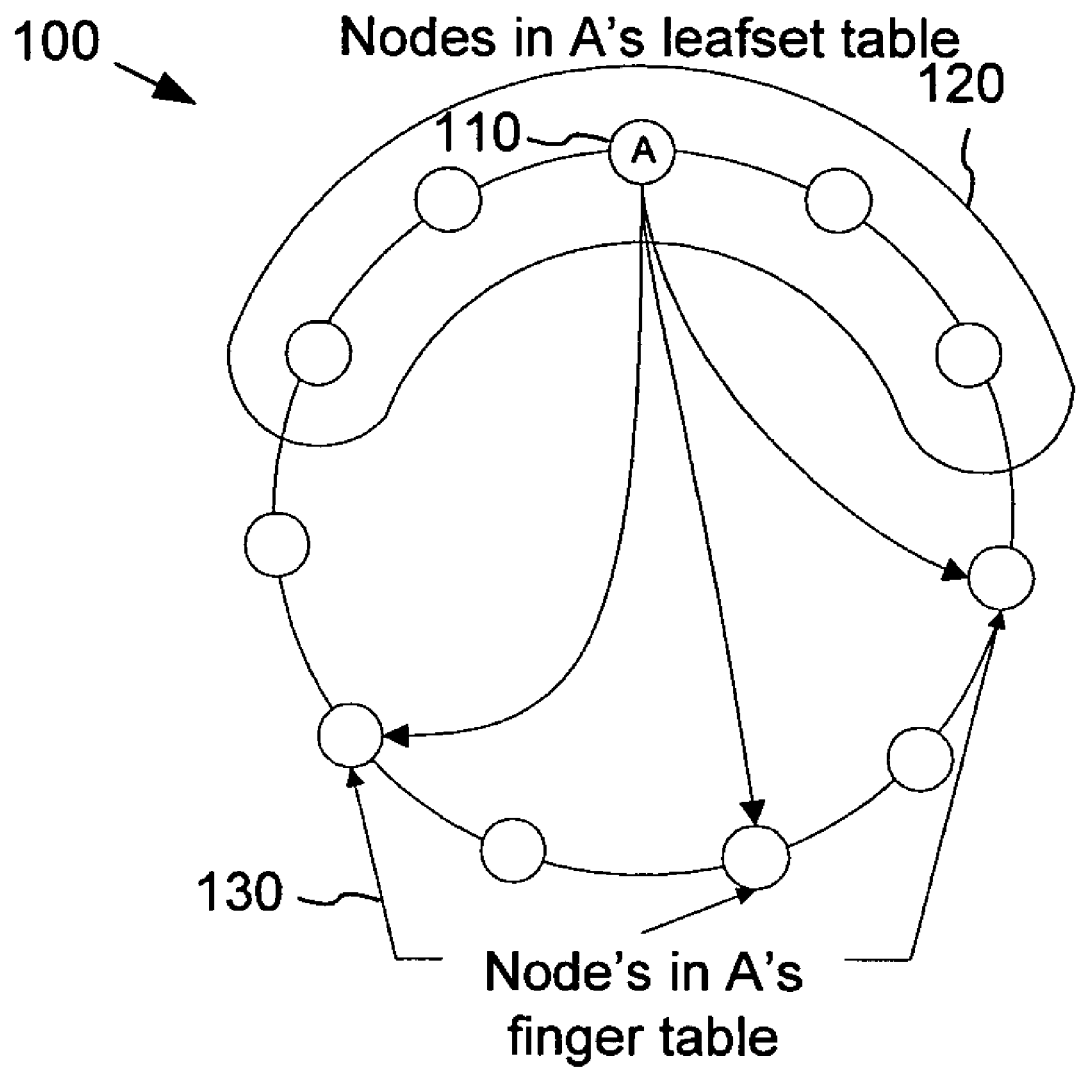
FIG. 1 is a block diagram illustrating a structured P2P overlay system using KBR with a leafset table and finger table in the prior art.

The following description relates to implementations of self-stabilizing overlay maintenance protocols in a peer-to-peer structured overlay system, as well as enhancements to the protocol to achieve fast convergence. Although the following description illustrates the inventive self-stabilizing maintenance protocol and fast convergence enhancement in the context of structured P2P overlay systems, it should be understood that this approach also can be applied to more generally to perform overlay maintenance in distributed systems. Further, although illustrated with application to an overlay system using a circular key space in which nodes generally are connected into a ring or multi-ring topology, the overlay maintenance protocols also can be applied to other forms of structured overlay systems, such as linear key spaces, etc.

1. Structured Overlay Topologies

Two types of initial topologies for the structured overlay are considered in the following description of the self-stabilizing overlay maintenance protocol. A first topology reflects the results of flash crowd behavior in which nodes join the structured overlay system with one or more random contact nodes in the system. This can be roughly approximated or simulated as a random topology, in which links between nodes are randomly added to construct an initial topology of the system. A second type of topology matches the network partition healing scenario. When a network partition occurs (e.g., due to system churn), the overlay topology is likely to be partitioned into several components, each of which is a well structured ring but is disconnected from other rings. When the network recovers from the partition, we assume that some external means (e.g., through regular broadcasts or some stable bootstrap nodes) detect the network partition, and add a few cross-ring links to reconnect the overall topology. So, the initial topology for the partition healing scenario is several well structured rings connected together with a few cross-ring links, which we call multi-ring topologies. The following description of the self-stabilizing overlay maintenance protocol mostly considers the random topologies and multi-ring topologies, but the self-stabilization maintenance protocol applies to any initially connected topology.

2. Self-Stabilizing Overlay Maintenance Protocols

Since leafset tables are mainly responsible for the routing consistency, the variations of maintenance protocols described below focus on leafset maintenance. For self stabilization of the overlay system, the leafset maintenance protocols should be able to bring the overlay to the correct structure (e.g., a single ring topology for a circular key space overlay) from any initially connected topology. In this section, the described maintenance protocol addresses the problem from two aspects. First, the maintenance protocol always stabilizes the overlay towards the correct structure. Second, the maintenance protocol avoids causing partitions during the healing process.

2.1 Basic Leafset Protocol

The basic leafset maintenance protocol proactively moves the topology of the overlay towards its correct state, given an arbitrary topology to start with. One key feature of the maintenance protocol is when a node periodically (or at other repeated intervals) pings its neighbors in the leafset to check its liveness, every leafset member returns its own view of the sender's leafset in the pong message. If this leafset view contains a node that is closer to the sender than some of sender's current leafset members, the sender collates the leafset view received with its own view to obtain a new leafset with closer neighbors. Therefore, the protocol enables the nodes to proactively search and move towards closer nodes in the logical space.

FIG. 2 provides a program code listing 200 of the basic leafset maintenance protocol executed by the nodes of a P2P overlay system. According to the basic leafset maintenance protocol, each node maintains two separate local buffers, an acquaintance set and a candidate set, as shown on lines 2-3 of the listing 200. The acquaintance set records nodes from which the local node receives ping or pong messages directly (line 36 representing the first-hand information. The candidate set includes nodes in the acquaintance set and the leafset view members piggybacked in the pong messages (line 46 representing the second-hand information. The leafset of a node is defined to be the L immediate successors and predecessors in its acquaintance set. A node only includes entries in its acquaintance set in its pong messages (lines 41-44). With this separation, the entry corresponding to a failed node will not be carried around indefinitely in the pong messages, and soon the node is timed out and removed from both the acquaintance and the candidate set (lines 49-58).

The neighbor searching mechanism is the key for the self stabilization of the basic leafset maintenance protocol. When a node A receives information in a pong message about a node B that is closer than some other nodes in A's current leafset, A does not directly add B into its leafset. Instead, according to the protocol, A keeps B in its candidate set, and pings B in the next ping cycle (lines 21-31 of the listing 200 in FIG. 2). If B responds to A's ping, A then adds B into A's acquaintance set (line 36) and thus the leafset. The ping messages act both as liveness checking messages for the current leafset members and as neighbor searching messages for closer candidates. The pong messages serve both as I-am-alive responses and as suggestions to the ping senders about the potential closer neighbors.

The basic leafset maintenance protocol unifies the handling of node failure, node join and partition healing into one ping-pong messaging mechanism. Node join with this protocol becomes trivial: the new node only needs to include the contact node in its acquaintance set, and the protocol takes care of the rest. The joining node essentially moves along the leafset topology towards its neighborhood, and stabilizes when it reaches its neighborhood. It is important to notice that when constructing a leafset view for a ping sender (lines 40-42), a node can use not only its acquaintance set but also other entries in its routing table such as its finger table entries. This accelerates the process of a new joining node locating its neighborhood. This has a similar effect to routing the join request to its neighbors. The maintenance protocol thus combines handling of the failures and joins together into a clean ping-pong structure.

Figure 3:
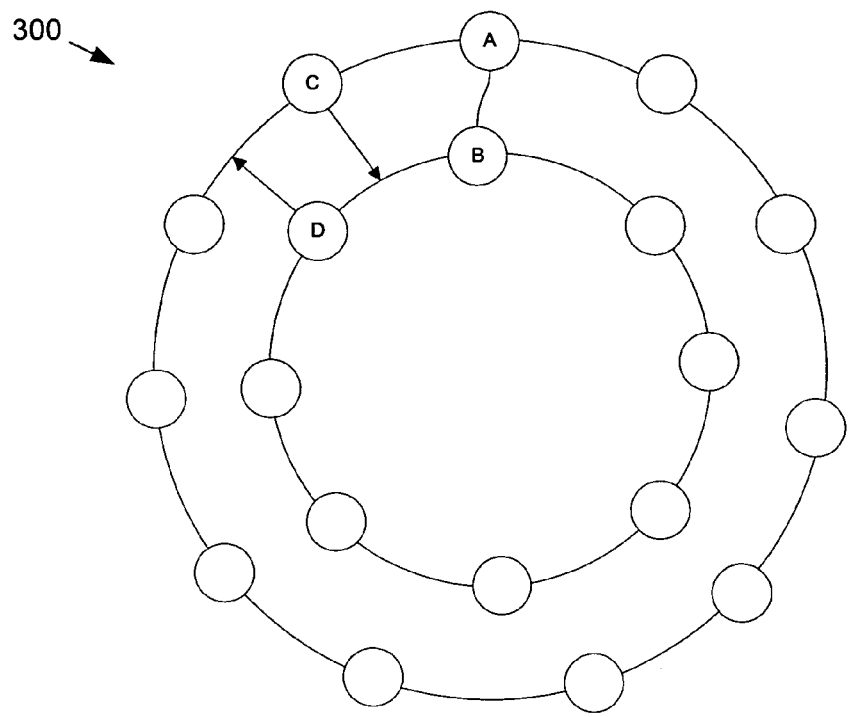
FIG. 3 illustrates an example of partition healing using the basic leafset maintenance protocol of FIG. 2 from an initial multi-ring topology with two rings.

FIG. 3 shows an example of partition healing from a multi-ring initial topology 300 with two rings. The link between nodes labeled A and B is the initial cross-ring link. The ping-pong messages exchanged between node A and B according to the basic maintenance protocol will add node C into node B's candidate set. Since node C is closer than node B's current counter-clockwise logical neighbor (node D), node B pings node C. After receiving node C's pong message, node B then adds node C into its acquaintance set. Later, when node B responds to node C's regular ping message, node D will be introduced to node C and node C will pull node D into its acquaintance set in the same manner as node B pulled node C. In this way, the pulling and merging process propagates along the rings in both clockwise and counter-clockwise directions resembling a zipping process, and the two rings of the initial topology become merged to form a topology with one ring after the zipping process traverses through the topology.

2.2. Steady State of the Basic Protocol

The basic leafset maintenance protocol stabilizes when there are no more changes to the acquaintance set and the candidate set on all nodes of the peer-to-peer overlay system. If there is a long enough stable period during which there is no system churn and message deliveries are reliable and timely, the protocol always stabilizes, because the acquaintance set and the candidate set only moves closer to the node and there are only a finite number of nodes in the system.

If in the stable period every pair of nodes can communicate directly with each other, it is not possible in the steady state to have a node B in the candidate set but not the acquaintance set of a node A while node B is within the range of node A's leafset. This is because if such a node B exists, node A will keep pinging node B (lines 27-31 of the protocol listing in FIG. 2). If node B is alive in the system, node A will receive a pong message from node B and add node B into its acquaintance set (line 36); if node B is dead, then node A will time out on node B and remove node B from its candidate set (lines 55-57). The basic maintenance protocol also can be readily extended to deal with any not fully connected network topology.

An important property of the steady state is the symmetry property: Based on the leafset tables, if node A's immediate successor (the node closest to node A in the clockwise direction) is node B, then node B's immediate predecessor is node A, and vise versa. The reason is that if node A's immediate successor is node B, node A will ping node B periodically. If on the contrary node B's immediate successor is not node A but another node C that is closer to node B, then node B will piggyback this information in the pong message to node A. As a result, node A adds C into its candidate set. As previously discussed, node A's candidate set should be the same as its acquaintance set within the leafset range, so node C should be in node A's acquaintance set in the steady state, which is contradicting to the assumption that node B is node A's immediate successor.

Figure 4:
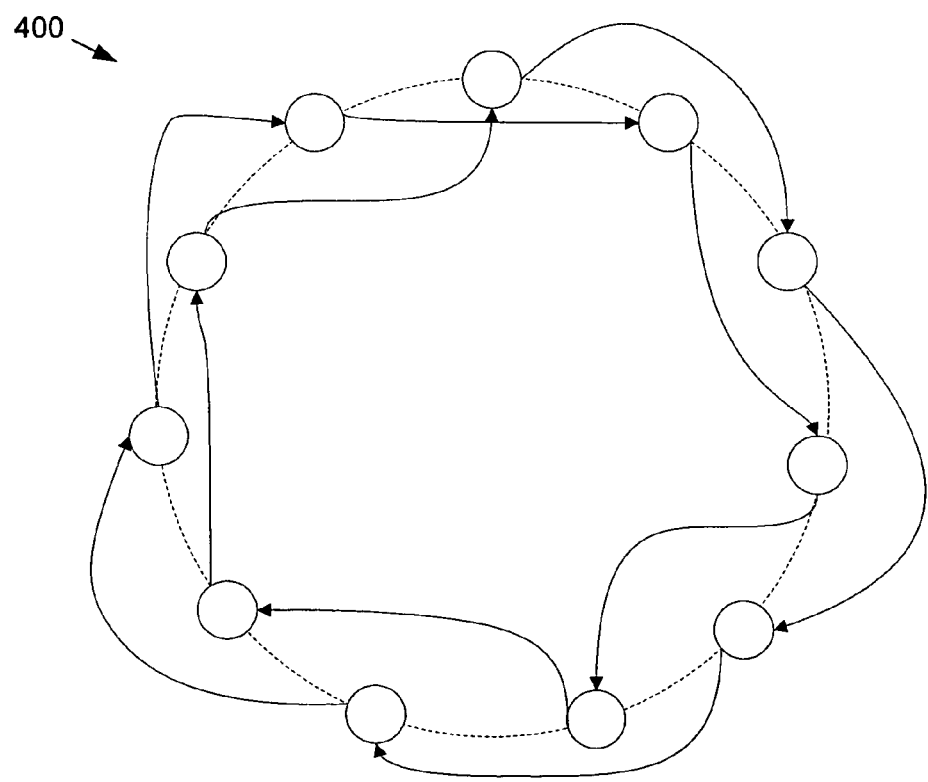
FIG. 4 illustrates an example of a structured P2P overlay system in a loopy state that may be recovered using the basic leafset maintenance protocol of FIG. 2.

With the above property, it is easy to see that in the steady state the topology built from immediate successor links must be one or more loops. The desired topology in the steady state of a structured overlay having a circular key space is a single ring that traverses the logical space exactly once. There are two possibilities that the steady state topology is not the desired one. The first possibility is that a loop may traverse the logical space multiple times before coming back to the starting point, such as in the example topology 400 of the overlay system shown in FIG. 4. This is called the loopy state topology.

One approach to address such loopy state topologies is to employ a loopy state detection and removal protocol. According to this protocol, a node detects the loopy state by simply conducting a self-searching along the successor direction on each node to find the immediate successor of its own ID after traversing the key space once, and then merges this immediate successor into the node's leafset to remove the loopy state. However, this loopy detection and removal protocol uses only the leafset entries of nodes in the process of self-searching to guarantee loopy detection. Therefore, the loopy detection and removal is a slow process because the protocol needs to traverse O(N) nodes along the successor list to detect a loopy state.

Although theoretically the basic maintenance protocol (without loopy removal) can also result in loopy states, experiments show that the maintenance protocol is very robust in avoiding the loopy states. This is a significant benefit of the maintenance protocol because it effectively avoids the O(N) slow loopy detection and removal process most of the time and enables fast convergence of the overlay.

The second possibility of the undesired steady state is multiple disconnected loops. It is possible that although the initial topology is connected, the protocol may cause the topology to be partitioned during its evolution. The next section discusses how to keep the connectivity of the topology.

2.3. Preserving Connectivity

Figure 5:
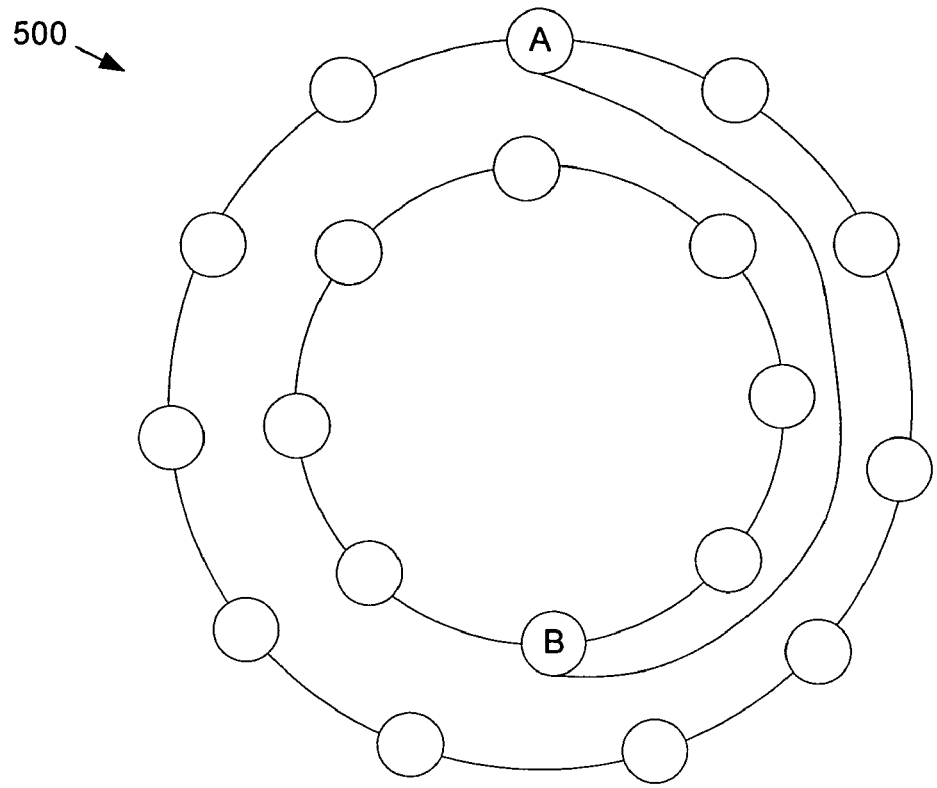
FIG. 5 illustrates an example of a structured P2P overlay system in a multi-ring topology that could become partitioned.

This section addresses the issue of preserving connectivity of the topology during its self-stabilizing process. FIG. 5 shows a negative example where the topology may be partitioned during the self-stabilizing process. In this topology, two previously partitioned ring structures are re-connected through a link between A and B. However, the link between nodes A and B will be broken eventually by the basic leafset maintenance protocol in the previous section, because nodes A and B are far away from each other in the key space and both of them already have enough leafset members. In general, the problem relates to the fact that leafset maintenance inevitably will remove some extra entries from the leafset to keep the size of the leafset, but the removal of leafset entries has the risk of disconnecting two previously connected nodes. Once the link between A and B is broken, the overlay topology is partitioned again.

An extension of the leafset maintenance protocol provides the further property of being connectivity preserving. This means that when the system is stable, for any two nodes A and B, if there exists a path in the topology from A to B at time $t_0$, then there is at least one path from A to B at any time after time $t_0$.

Figure 6:
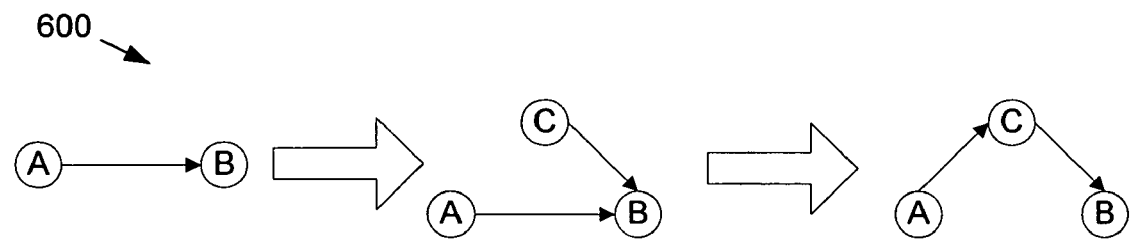
FIG. 6 illustrates a connectivity-preserving process for removal of a link between two nodes in an overlay system according to the leafset maintenance protocol.

FIG. 6 illustrates how the connectivity-preserving extension of the leafset maintenance protocol preserves connectivity through an example 600. Initially, there is a link from node A to node B (i.e., node B is in node A's leafset table). Node A would like to remove the link to node B since node A already knows enough nodes closer to itself than node B. Node A cannot simply remove its link to node B because it may destroy connectivity (e.g., the link between node A and node B may be the only link connecting rings of a multi-ring topology as shown in FIG. 5, such that its removal partitions the topology).

Instead, according to the connectivity-preserving leafset maintenance protocol, node A pings node B to ask node B to provide a replacement node C, which satisfies the following properties: (1) node B knows that node C is pointing to node B; and (2) node C is closer than node B to node A. When node B supplies node C to node A, node A can switch to connect to node C and break the connection to node B, because node A knows that through node C it can still indirectly connect to node B. If node C is still too far away from node A, node A can continue this process until the replacement falls into node A's leafset, in which case node A's leafset is stable. In the example, if node B does not know any node C that satisfies the two properties, node B cannot supply such a node C and thus node A cannot break the link from node A to node B. However, since node A knows enough nodes between node A and node B, node A will pass this knowledge to node B through the ping-pong message exchange and gradually node B will learn some new node C that satisfy the two properties. Eventually, the link from node A and node B can still be removed and replaced by other links, while preserving the connectivity of the overlay system.

A further issue with the above approach is that concurrent changes may jeopardize the overlay connectivity. For example, suppose that node A and node C are far away from node B but very close to each other and both node A and node C want to remove their links to node B. When node A asks node B to provide a replacement, node B supplies node C; symmetrically, when node C asks node B to provide a replacement, node B provides node A. The result is both nodes A and C remove their links to node B and establish links pointing to each other. This however disconnects B from A and C.

To resolve the issue, the connectivity-preserving leafset maintenance protocol breaks the circularity in the above scenario. To do so, the protocol uses the node distance to order all nodes according to the distance to node B, the node to be replaced. The node A can remove the link to node B only if the replacement is closer than node A to node B. Thus, in the above example only one of node A and node C can remove the link to node B. (If nodes A and C have the same distance to node B, neither of them is allowed to remove the link to node B.) Moreover, if node B is indeed far away from node A, node B needs to provide replacement nodes on both sides of node B so that node A can find at least some node closer than itself to node B to replace its link to node B. The connectivity-preserving leafset maintenance protocol uses node B's leafset for this purpose.

The connectivity-preserving scheme just described can be implemented by changing some data structures of the leafset maintenance protocol shown in FIG. 2 to explicitly manage directed links. The candidate set keeps the same semantic, while the acquaintance set of a node A is split into two sets: a source set keeping the nodes that point to node A, and a sink set keeping the nodes that A points to. For any directed link with a source and a sink, the source is the active one that maintains the link while the sink is the passive one receiving notifications.

Figure 7:
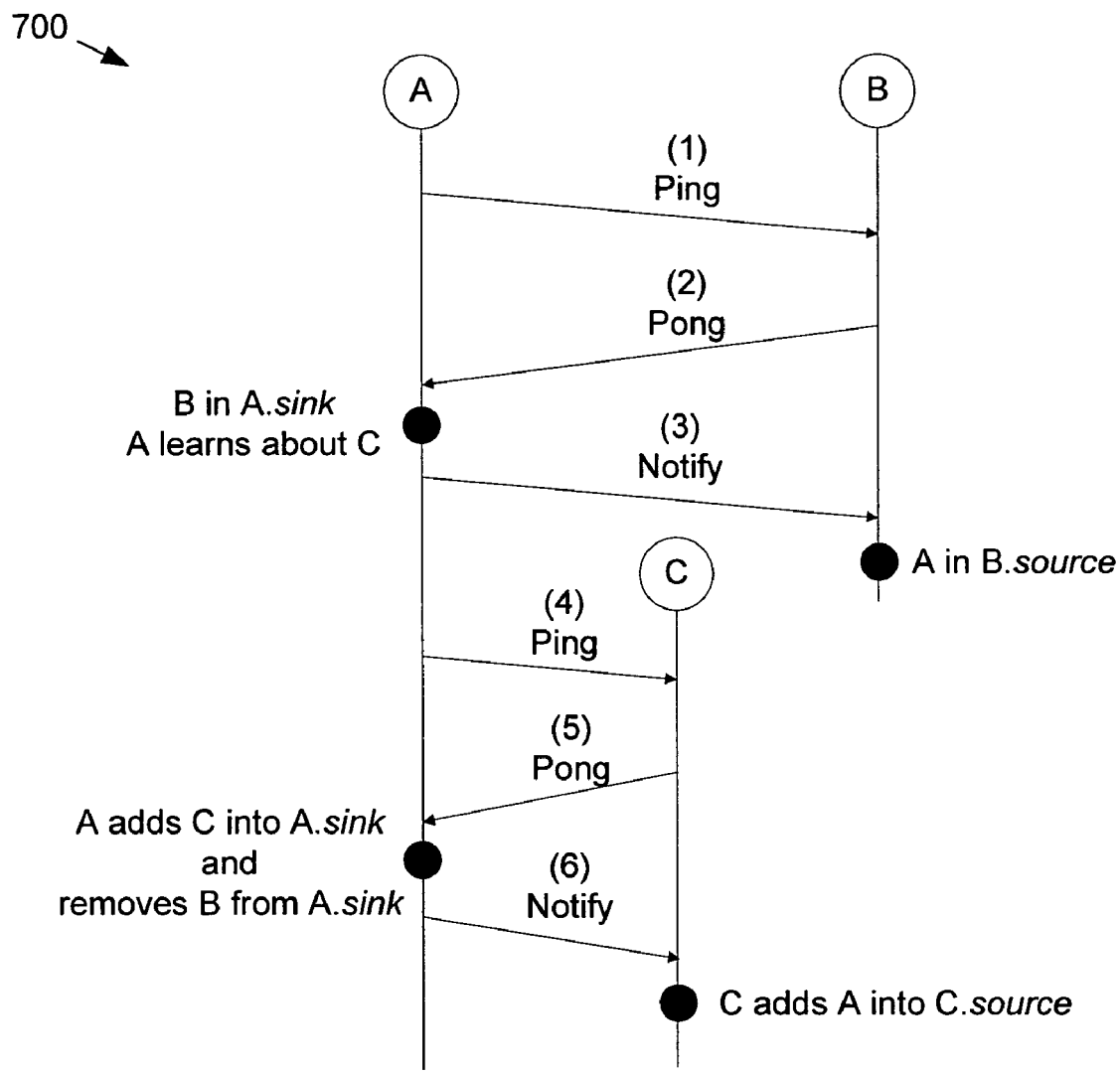
FIG. 7 is a messaging diagram showing interaction between the three nodes shown in FIG. 6 according to a variation of the leafset maintenance protocol with connectivity preservation.

More specifically, the connectivity-preserving leafset maintenance protocol uses a ping-pong-notify sequence 700 of messages to manage its directed links as illustrated in FIG. 7. For a link from node A to node B, node A first pings node B and node B responds with a pong message. When node A receives the pong, node A adds node B into its sink set, establishing the link. Then, node A sends a notify message to node B. When node B receives the notify message from node A, it adds node A into its source set (the first three message exchanges in FIG. 7). Therefore, when node B adds node A into its source set, node A must have pointed to node B already. To maintain the link, node A is responsible to ping node B periodically, and it goes through the ping-pong-notify cycle so that node A keeps node B in its sink set while node B keeps node A in its source set. If node A is in node B's source set and also in node B's leafset range, then node B also will ping node A to bring node A into its sink set (i.e., establish the reverse link from node B to node A). Eventually, for two nodes within the leafset range, they will form bidirectional links and they will appear in each other's source and sink sets—the eventual symmetry property similar to the one for the previous algorithm. For nodes outside the leafset range, eventually through replacement they will be removed from both source and sink sets. A key difference with the basic leafset maintenance protocol shown in FIG. 2 is that in the connectivity preserving leafset maintenance protocol, when a node B receives a ping from a node A, it does not add node A into node B's sink or source set, while in the basic protocol node B directly adds node A into its acquaintance set.

With the source and sink set structure, the connectivity-preserving protocol has the six-step interaction shown in FIG. 7 for node A to remove a link to node B and replace it with a link to node C:

(1) Node A sends a ping message to node B, asking for node B's source set.
(2) On receiving node A's ping request, node B returns to node A a pong message with the replacement set, which includes some nodes closest to itself (including node C) that are in node B's source set. This is in addition to the leafset view of node A that node B returns in the basic leafset maintenance protocol of FIG. 2.
(3) Now node A knows about node C. But, because node A is still not sure whether it can connect to node C, it has to keep node B in its sink set. So, it sends a notify message to inform node B that it still points to node B.
(4) Later, node A probes node C by sending a ping message.
(5) Node C replies a pong to node A. After receiving the pong message, node A is sure that node C is reachable. At this point node A adds node C into its sink set. If node C is closer than node B to node A and also closer than node A to node B, and node A is not in the replacement set from node B, node A removes node B from its sink set now.
(6) Because node C is added to the sink set of node A, node A sends a notify message and tells node C. When node C receives the notify message from node A, it adds node A into its source set.

A pseudo-code listing 800 of the connectivity-preserving leafset maintenance protocol shown in FIGS. 8-10 merges the neighbor searching behavior of the basic leafset maintenance protocol in FIG. 2 and the connectivity preserving enhancement described above. Lines 1-10, 25-28, 49-51 and 68-101 are the enhancement dealing with preserving connectivity, while others deal with neighbor searching of the leafset as in FIG. 2, although the code segments may not be exactly the same.

For this connectivity-preserving protocol, we define that a routing topology corresponding to the leafset tables of nodes as follows: There exists a link from node A to node B in the topology if and only if node B is in node A's sink set. With the eventual symmetry property and the connectivity preserving property, we can deduce the following strong property on the evolution of routing topology: If the initial routing topology is weakly connected (i.e., it is connected when transforming all directed links to undirected ones), then eventually the routing topology is strongly connected (i.e. every node can reach every other node through a path of directed links). The reason is that for any undirected path in the initial topology, there is still an undirected path in every topology evolved from this initial topology by the connectivity preserving property. By the eventual symmetry property, eventually every directed link also has its reverse link in the topology. Therefore, eventually any two nodes with an undirected path are also connected by directed path in both directions. The protocol has proven to guarantee that it preserves the connectivity of the overlay system from any initial topology and stabilizes into a loop structure. With further loopy detection and correction, the protocol will stabilize any initially weakly connected topology into a correct single-ring structure.

The above discussion concerns how to keep connectivity for the leafset-based overlay topology, but can be easily extended to the whole routing table including both leafset table and finger table maintenance. For example, in the multi-ring topology shown in FIG. 5, even if the link between nodes A and B corresponds to a finger entry, the protocol can still achieve self stabilization and preserve connectivity with only two modifications for finger table maintenance. First, when a node A wants to remove a finger entry, node A should put the entry back to its leafset first (more precisely its sink set), and the above leafset protocol takes care of removing the link while preserving connectivity. Second, every finger entry should be put back to the sink set of the node periodically. This is to check if the finger entry is connecting a different component (e.g. FIG. 5), and if so, use the leafset maintenance protocol to stabilize the topology into a single ring. Therefore, this modified protocol can stabilize the overlay topology constructed by all routing table entries, thus making it more robust.

3. Fast Overlay Convergence

In this section, we show how to speed up the convergence process so that the overlay topology can converge in O(log N) steps where N is the number of nodes in the system. In contrast, protocols without such acceleration mechanism may take O(N) steps to converge. Fast convergence is important because it significantly reduces the transition period where the routings may be incorrect, and also is more robust under churn because the protocol heals the damages of churn faster.

3.1. Using Finger Entries for Fast Convergence

A typical scenario where the above connectivity-preserving protocol has O(N) convergence time is the scenario of partition healing illustrated in FIG. 3 above. For example, consider the two-ring topology shown in FIG. 5. The topology initially is partitioned into two rings each roughly N/2 nodes in size. A link between nodes A and B is added to start the partition healing process by the leafset maintenance protocol, which has two phases. First, node A uses the connectivity preserving mechanism to gradually replace its link to node B with a link to its neighborhood node in node B's ring, so that it can include a node from node B's ring into its leafset. When this occurs, node A forms what is referred to herein as a healing point for the two rings. This first phase establishing a healing point may takes O(N) time. Second, once the first healing point is generated, the leafset maintenance protocol moves along the leafset to merge the two rings. This zipping process to merge the rings also takes O(N) time.

A further extension of the maintenance protocol reduces the partition healing time by speeding up both of these processes (i.e., the process to establish the healing point and zipping). This fast convergence protocol extension leverages the O(logN) routing ability of the finger table.

First, the fast convergence protocol more quickly creates the first healing point. FIGS. 11-12 provide a program listing 1100 for the fast convergence extensions (at lines 6-7, 17, 22-25, 27-30, 38-39 and 51-53) of relevant code segments from the maintenance protocol program listing 800 in FIGS. 8-10 that achieve the fast creation of the first healing point. In particular, if there is a link from node A to node B as in the case of the topology 500 shown in FIG. 5, then node B also considers nodes from its finger table when finding the closest nodes to node A in its own leafset view of node A for its pong message (c.f., FIG. 11, line 38-41 and FIG. 9, lines 53-55). So, when receiving node B's pong, node A will be able to know some nodes in node B's ring of the topology, which are much closer than node B. However, simply putting these nodes into node A's candidate set could not help because they might still be outside node A's current leafset view. Therefore, node A would not send further pings to them and the process would not be accelerated. So as to force node A to send pings to these nodes, the fast convergence protocol puts them in a separate node set (called the pingset). When it is time for node A to send pings out, node A will guarantee to send a ping to each node in the pingset. In this way, the fast convergence protocol essentially performs a routing from node B to the closest node to node A in node B's ring. Actually, node A putting the closest node provided in node B's pong message into node A's pingset is enough to search for the desired node in node B's ring. Since the connectivity preserving logic is still moving the links along the leafset table, the protocol actually tries one routing on each node along the way, which should be adequately robust. However, alternative variations of the fast convergence protocol can add more than one node from the pong message to the pingset for added robustness.

Secondly, once the first healing point is generated, the fast-convergence protocol also creates more healing points on the rings, so that the healing operations are carried out in parallel at many points. Again, the finger tables are used to spread healing points, because the finger tables provide shortcuts to remote locations in the logical space and provide efficient broadcast structure. For spreading more healing points, the immediate leafset neighbors at the first healing point synchronize their finger tables and find potential new healing points (i.e., nodes in separate rings that are close in the keyspace). For example, as shown in FIG. 12, suppose healing point 1 is at nodes A and B initially. Nodes A and B exchange their finger table entries. When node A probes its finger node C, node A then tells node C about node D, which is one of node B's finger entries that node A sees as the closest to node C. On receiving the probe message, if node C thinks node D is close enough, node C puts node D in its candidate set. As per the leafset maintenance protocol, node C will then pull node D into its leafset. When this happens, a new healing point (healing point 2) is created. This process is carried out for all finger table entries of the immediate leafset neighbors, nodes A and B.

In this healing point spreading process, healing point 2 may not be created because nodes C and D are not close enough to be added to each others leafset according to the leafset maintenance protocol. But, because the effort of creating new healing points is applied on every pair of immediate neighbors and on every finger entry, there is a good chance that within a few finger exchange steps several new healing points can be generated. When this process continues at the second and subsequent healing points, it is likely to make the healing point spreading process exponentially fast. Furthermore, the non-deterministic nature of the healing point generation also randomizes the placement of the healing points. Thus, the high merging speed can be sustained. It is worthy pointing out that this method only depends on the randomness of the placement of the healing points, which can be easily satisfied by most of the finger structures.

Figure 13:
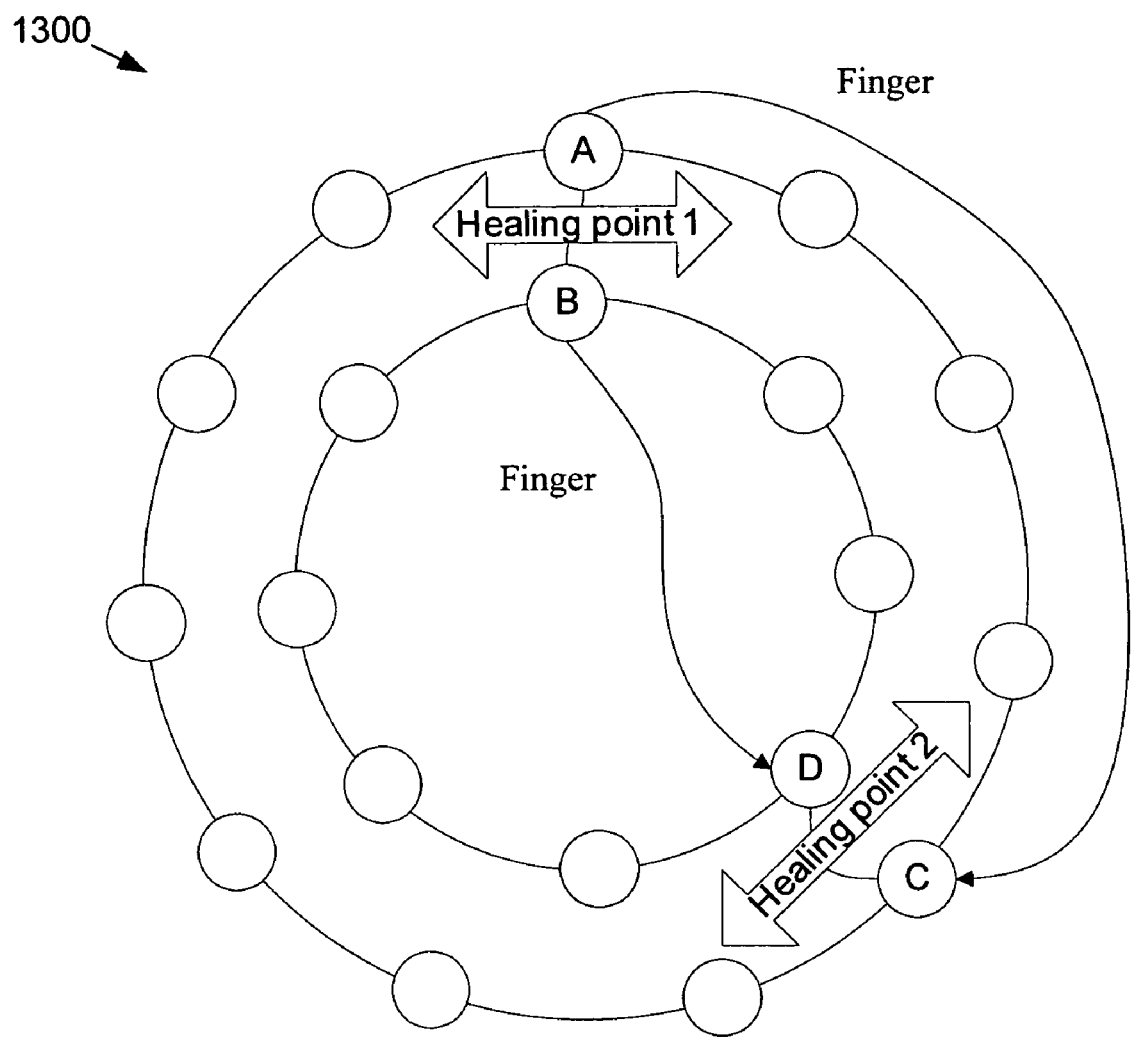
FIG. 13 illustrates an example of generating a new healing point on-the-fly for fast overlay convergence using the maintenance protocol in FIGS. 11-12.

FIGS. 14-15 show a detailed pseudo code listing 1400 of the procedure for immediate leafset neighbors to exchange finger tables and attempt to create new healing points. The overhead of this protocol is quite low because it only requires a little extra traffic for finger table exchange between immediate leafset neighbors (e.g., nodes A and B at the healing point 1 in the example overlay topology 1300 shown in FIG. 13). This traffic can be further limited by controlling the synchronization frequency or the number of finger entries to be synchronized. The traffic of telling node C about node D or vice versa is embedded inside the normal finger probes, and is negligible. Also, this fast-convergence protocol does not disturb the normal leafset maintenance. As a result, the fast-convergence protocol could be enabled all the time, even when the overlay is in a normal state without ring merging going on. Therefore, the protocol does not require special purpose code to start and end this healing process. Instead, as soon as the overlay topology becomes connected, this fast healing process automatically takes effect to move the topology back to the single ring structure. In alternative implementations, the fast-convergence protocol can simply be enabled when a network partition is detection and recovery is initiated, up until the correct single ring topology is achieved.

6. Computing Environment

The above-described self-stabilizing overlay maintenance protocol (including the connectivity preserving and fast convergence extensions) can be realized on any of a variety of peer-to-peer distributed systems, composed of nodes that may include among other examples, computers; cell phones or other communications devices; game consoles, media players and other entertainment devices; and etc. The self-stabilizing overlay maintenance protocol can be implemented in hardware circuitry, in firmware, operating system, as well as in peer-to-peer application software executing within a computer or other computing environment, such as shown in FIG. 16.

Figure 16:
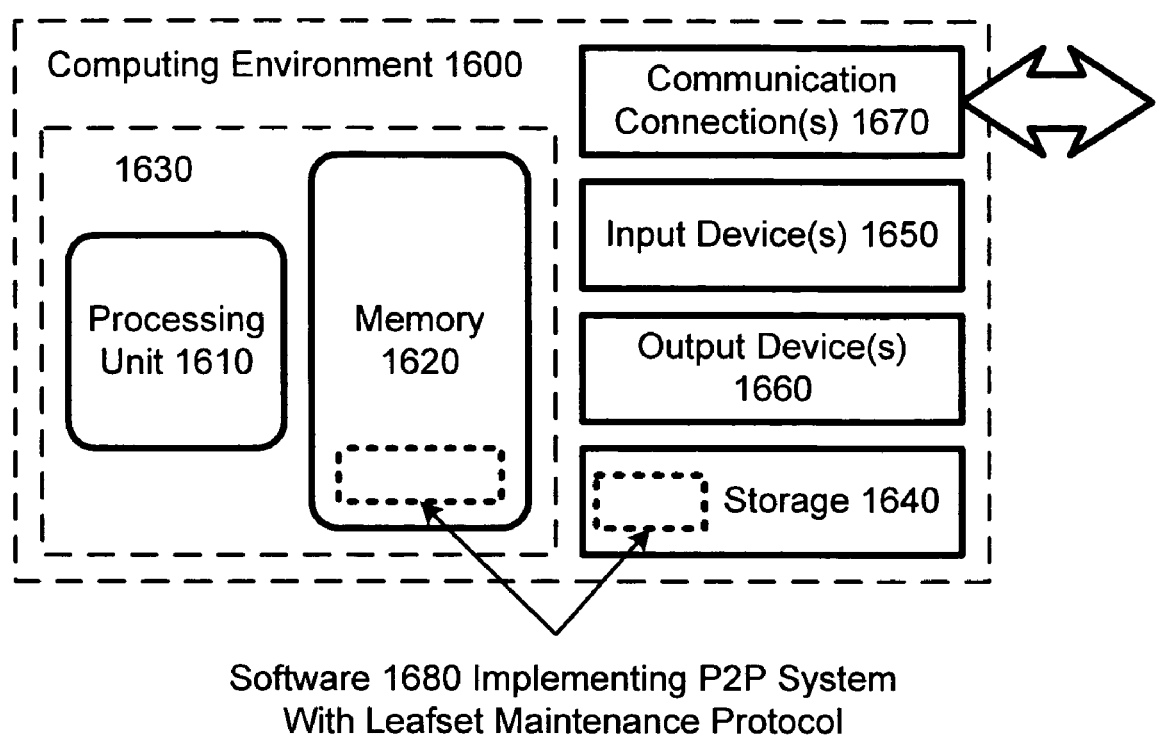
FIG. 16 is a block diagram of a suitable computing environment for implementing peer nodes of the structured peer-to-peer overlay system of FIG. 1 with the self-stabilizing leafset maintenance protocol of FIGS. 2, 6-12 and 14-15.

FIG. 16 illustrates a generalized example of a suitable computing environment (1600) in which various nodes of the described peer-to-peer overlay system 100 (FIG. 1) with the addition of the self-stabilizing overlay maintenance protocol 200 (FIG. 2) and extensions may be implemented. The computing environment (1600) is not intended to suggest any limitation as to scope of use or functionality of the invention, as the present invention may be implemented in diverse general-purpose or special-purpose computing environments.

With reference to FIG. 16, the computing environment (1600) includes at least one processing unit (1610) and memory (1620). In FIG. 16, this most basic configuration (1630) is included within a dashed line. The processing unit (1610) executes computer-executable instructions and may be a real or a virtual processor. In a multi-processing system, multiple processing units execute computer-executable instructions to increase processing power. The memory (1620) may be volatile memory (e.g., registers, cache, RAM), non-volatile memory (e.g., ROM, EEPROM, flash memory, etc.), or some combination of the two. The memory (1620) stores software (1680) implementing the described self-stabilizing overlay maintenance protocol.

A computing environment may have additional features. For example, the computing environment (1600) includes storage (1640), one or more input devices (1650), one or more output devices (1660), and one or more communication connections (1670). An interconnection mechanism (not shown) such as a bus, controller, or network interconnects the components of the computing environment (1600). Typically, operating system software (not shown) provides an operating environment for other software executing in the computing environment (1600), and coordinates activities of the components of the computing environment (1600).

The storage (1640) may be removable or non-removable, and includes magnetic disks, magnetic tapes or cassettes, CD-ROMs, CD-RWs, DVDs, or any other medium which can be used to store information and which can be accessed within the computing environment (1600). The storage (1640) stores instructions for the software (1680) implementing the described self-stabilizing overlay maintenance protocol.

The input device(s) (1650) may be a touch input device such as a keyboard, mouse, pen, or trackball, a voice input device, a scanning device, or another device that provides input to the computing environment (1600). For audio, the input device(s) (1650) may be a sound card or similar device that accepts audio input in analog or digital form, or a CD-ROM reader that provides audio samples to the computing environment. The output device(s) (1660) may be a display, printer, speaker, CD-writer, or another device that provides output from the computing environment (1600).

The communication connection(s) (1670) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The self-stabilizing overlay maintenance protocol described herein can be defined in the general context of computer-readable media. Computer-readable media are any available media that can be accessed within a computing environment. By way of example, and not limitation, with the computing environment (1600), computer-readable media include memory (1620), storage (1640), communication media, and combinations of any of the above.

The self-stabilizing overlay maintenance protocol described herein can be defined in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method for a node of a structured peer-to-peer overlay system to maintain a routing table containing a leafset group of logical neighboring nodes within the overlay system whereby the overlay system self-stabilizes toward a correct topology, the method comprising:

at ping intervals, transmitting a liveness check message by said node to the logical neighboring nodes of said node's leafset group; and on receiving a liveness check message from a ping-sender node, producing a view of leafset group nodes for the ping-sender node based on nodes in at least a portion of the routing table of said node;

transmitting a liveness check response by said node to the ping-sender node, the liveness check response containing information of the view of leafset group nodes for the ping-sender node;

maintaining by said node information of an acquaintance set of nodes from which said node has received a liveness check message or response, and a candidate set of nodes that includes the acquaintance set and nodes identified in liveness check responses received from other nodes, wherein the leafset group of nodes for said node is a number of immediately neighboring nodes to said node from the acquaintance set;

on said node receiving a liveness check response from a pong-sender node containing information identifying other nodes of the overlay system, adding the pong-sender node to the acquaintance set; and updating the candidate set of nodes to include the other nodes identified in the liveness check response; and searching by said node the candidate set of nodes for any nodes logically closer to said node than nodes currently in the leafset group of said node, and if so also transmitting the liveness check message by said node to the node logically closer than nodes currently in the leafset group.

2. The method of claim 1 wherein the routing table further contains a finger set of logically remote nodes, and said node produces the view of leafset group nodes for the ping-sender node based on the finger set as well as the leafset group of nodes.

3. The method of claim 1 wherein the routing table further contains a finger set of logically remote nodes, wherein said node produces the view of leafset group nodes for the ping-sender node based on the finger set as well as the leafset group of nodes, and the method further comprises:

on said node receiving the liveness check response from the pong-sender node, adding at least one node closest to said node out of the nodes identified in the liveness check response into a ping set; and transmitting the liveness check message by said node also to the ping set node.

4. The method of claim 1 wherein the routing table further contains a finger set of logically remote nodes, and the method further comprises:

exchanging by said node finger set information with an immediate neighboring node out of the leafset group;

transmitting by said node a probe message to the finger set of said node containing information of nodes in the finger set of the immediate neighboring node; and on said node receiving a probe message from a probe-sender node, updating the candidate set of nodes to include any nodes identified in the probe message from the probe-sender node that are sufficiently close to said node.

5. The method of claim 1 further comprising if no liveness check response is received in response to the liveness check message within a time-out period, removing the node to which the liveness check message was transmitted from the candidate and acquaintance sets of said node.

6. The method of claim 1 further comprising:

maintaining by said node information of a sink set of the nodes out of the acquaintance set to which said node transmits liveness check messages, and a source set of the nodes out of the acquaintance set from which said node receives liveness check messages;

on said node receiving the liveness check response from the pong-sender node,
   if not already, adding by said node the pong-sender node to the sink set; and
   transmitting a notify message to the pong-sender node; and on said node receiving a notify message from a notify-sender node, adding by said node the notify-sender node to the source set.

7. The method of claim 6 for also preserving connectivity of the overlay system, the method further comprising:

on said node receiving the liveness check message from the ping-sender node, transmitting the liveness check response also containing information of a replacement set for said node comprising at least some nodes close to said node from the source set of said node;

after receiving the liveness check response from the pong-sender node containing information of a replacement set for the pong-sender node,
   selecting a replacement node from the replacement set for the pong-sender node that is closer to said node than the pong-sender node and also closer to the pong-sender node than said node;
   transmitting by said node a liveness check message to the selected replacement node;
   upon said node receiving a liveness check response from the selected replacement node,
      adding by said node the selected replacement node to the sink set of said node;
      removing by said node the pong-sender node from the sink set of said node; and
      transmitting the notify message to the selected replacement node.

8. The method of claim 7 wherein the routing table of said node further contains a finger set of logically remote nodes, and the method further comprises for maintaining the finger set of said node:

when removing a node from the finger set, placing the node being removed from the finger set into the sink set.

9. The method of claim 7 wherein the routing table of said node further contains a finger set of logically remote nodes, and the method further comprises for maintaining the finger set of said node:

periodically adding the finger set nodes into the sink set.

10. A node of a structured peer-to-peer overlay system, the node comprising:

a routing table storing information of a leafset of logical neighboring nodes and a finger set of logically remote nodes within the overlay system;

means for periodically transmitting a liveness check message to the nodes in the leafset;

means responsive to receiving a liveness check message from a ping-sender node for transmitting a liveness check response message containing the node's view of the leafset nodes for the ping-sender node based on the information of leafset and finger set nodes in the routing table;

a buffer memory storing information of an acquaintance set of nodes from which a liveness check message or liveness check response message has been received, and a candidate set of nodes that includes the acquaintance set and nodes identified in liveness check response messages received from other nodes, wherein the leafset group of nodes for said node is a number of immediately neighboring nodes to said node from the acquaintance set;

means responsive to receiving a liveness check response message from a pong-sender node in which the pong-sender identifies other nodes of the overlay system for adding the pong-sender node to the acquaintance set, and updating the candidate set of nodes to include the other nodes identified in the liveness check response message; and means for also transmitting the liveness check message to any node out of the candidate set that is logically closer than those currently in the leafset group.

11. The overlay system node of claim 10 further comprising:

means responsive to receiving the liveness check response message from the pong-sender node for further creating a ping set containing at least one closest node out of the nodes identified in the liveness check response message; and means for also transmitting the liveness check message to nodes in the ping set.

12. The overlay system node of claim 10 further comprising:

means for exchanging finger set information with an immediate neighboring node in the leafset;

means for transmitting a probe message to the finger set containing information of nodes in the finger set of the immediate neighboring node; and means responsive to receiving a probe message from a probe-sender node for updating the candidate set of nodes to include any nodes identified in the probe message from the probe-sender node that are sufficiently close to said node.

13. The overlay system node of claim 10 further comprising:

the buffer memory further storing a sink set of the nodes out of the acquaintance set to which liveness check messages are transmitted, and a source set of the nodes out of the acquaintance set from which liveness check messages are received;

the means responsive to receiving the liveness check response message from the pong-sender node further operating to update the sink set to include the pong-sender node, and to transmit a notify message to the pong-sender node; and means responsive to receiving a notify message from a notify-sender node for updating the source set to include the notify-sender node.

14. The overlay system node of claim 13 further comprising:
- the means responsive to receiving the liveness check message from the ping-sender node further operating to transmit the liveness check response message to also contain information of a replacement set comprising at least some close-by nodes from the source set;
- means operative after receiving the liveness check response message from the pong-sender node containing information of a replacement set for the pong-sender node for selecting a replacement node from the replacement set for the pong-sender node that is closer than the pong-sender node to the overlay system node and closer than the overlay system node to the pong-sender node;
- means for transmitting a liveness check message to the selected replacement node;
- means responsive to receiving a liveness check response message from the selected replacement node for adding by said node the selected replacement node to the sink set of said node, removing by said node the pong-sender node from the sink set of said node, and transmitting the notify message to the selected replacement node.

15. The overlay system node of claim 13 further comprising:
- means for placing a node to be removed from the finger set into the sink set; and
- means for periodically adding the finger set nodes into the sink set.

16. One or more computer-readable media containing instructions which, when executed by a computer, cause the computer to perform a method for self-stabilizing and fast convergence of a structured peer-to-peer overlay system containing the computer, the method comprising:
- storing a routing table containing a leafset group of logical neighboring nodes and a finger set of logically remote nodes within the overlay system;
- at ping intervals, transmitting a liveness check message to the leafset nodes;
- on receiving a liveness check message from a ping-sender node, transmitting a liveness check message to the ping-sender node containing information representing a view of leafset nodes for the ping-sender node based on at least a portion of the routing table;
- storing information of an acquaintance set of nodes from which a liveness check message or liveness check response message has been received, and a candidate set of nodes that includes the acquaintance set and nodes identified in liveness check response messages received from other nodes, wherein the leafset group of nodes is a number of immediately neighboring nodes out of the acquaintance set;
- in response to receiving a liveness check response message from a pong-sender node containing information identifying other nodes of the overlay system,
  - adding the pong-sender node to the acquaintance set; and
  - updating the candidate set of nodes to include the other nodes identified in the liveness check response message; and
- searching the candidate set of nodes for any nodes logically closer than nodes currently in the leafset group of said node, and if so also transmitting the liveness check message by said node to the node logically closer than nodes currently in the leafset group.

17. One or more computer-readable media containing instructions which, when executed by a computer, cause the computer to perform a method for self-stabilizing and fast convergence of a structured peer-to-peer overlay system containing the computer, the method comprising:
- storing a routing table containing a leafset group of logical neighboring nodes and a finger set of logically remote nodes within the overlay system;
- at ping intervals, transmitting a liveness check message to the leafset nodes;
- on receiving a liveness check message from a ping-sender node, transmitting a liveness check message to the ping-sender node containing information representing a view of leafset nodes for the ping-sender node based on at least a portion of the routing table;
- in response to receiving the liveness check message from the pong-sender node, adding at least one closest node out of the nodes identified in the liveness check response message into a ping set, and transmitting the liveness check message also to the ping set node;
- exchanging finger set information with an immediate neighboring node out of the leafset group;
- transmitting a probe message to nodes in the finger set containing information of nodes in the finger set of the immediate neighboring node; and
- in response to receiving a probe message from a probe-sender node, updating the candidate set of nodes to include any nodes identified in the probe message from the probe-sender node that are sufficiently close to said node.

\* \* \* \* \*

UNITED STATES PATENT AND TRADEMARK OFFICE
CERTIFICATE OF CORRECTION

| | | |
|---|---|---|
| PATENT NO. | : 7,664,107 B2 | Page 1 of 1 |
| APPLICATION NO. | : 11/399679 | |
| DATED | : February 16, 2010 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Thirtieth Day of November, 2010

David J. Kappos
*Director of the United States Patent and Trademark Office*